Patented May 16, 1939

2,158,311

UNITED STATES PATENT OFFICE 2,158,311

PROCESS OF PREPARING POLYMERIC PRODUCTS

Werner Starck, Hofheim in Taunus, and Heinrich Freudenberger, Frankfort-on-the-Main-Nied, Germany, assignors to I. G. Farbenindustrie Aktiengesellschaft, Frankfort-on-the-Main, Germany No Drawing. Application September 20, 1937, Serial No. 164,756. In Germany September 23, 1936

6 Claims. (Cl. 260—73)

The present invention relates to a process of preparing polymeric products.

United States application Serial No. 49,642, filed November 13, 1935, in the name of Werner Starck and Heinrich Freudenberger, describes a process of preparing polymerization products which consists in polymerizing among others vinyl ester in the presence of an aqueous solution of polyvinyl alcohol. The polyvinyl alcohol acts in this case as emulsifying agent so that the polymerization product is obtained in the form of a very stable emulsion.

Now we have found a process in which the polyvinyl esters formed as indicated above and containing a certain quantity of polyvinyl alcohol in intimate mixture, are transformed into polyvinyl acetals in a very simple and easy manner by causing a carbonyl compound to act upon the emulsion. In this case not only the polymeric ester but also the polyvinyl alcohol acting as an emulsifying agent is acetalized. The process may consist in adding to the emulsion the calculated quantity of a carbonyl compound, for instance of an aldehyde, an acid, for instance mineral acids, such as sulfuric acid, hydrochloric acid, nitric acid, phosphoric acid, hydrofluoboric acid, or strong organic acids, such as toluene-sulfonic acid and other strong sulfonic acids, which acts as a catalyst and, if desired, an alcohol, such as methyl alcohol, ethyl alcohol, propyl alcohol, for binding the acid produced. The mixture is heated, while vigorously stirring, until the reaction has attained the desired degree. After the product has been heated for about 24 hours to 80° C. to 90° C. a quantitative acetalisation is obtained. A turbid solution of the polyvinyl acetal produced is obtained. From this solution the solid product may be obtained in any usual manner, for instance, by precipitation in water, washing away the acid and drying under reduced pressure. Instead of polyvinyl alcohol its watersoluble derivatives may be used as emulsifying agents, for instance a polyvinyl alcohol partially esterified with an organic acid, such as acetic acid, propionic acid, butyric acid, so that it is still watersoluble, or a polyvinyl alcohol partially acetalized with aldehydes, such as formaldehyde, acetaldehyde, butyraldenyde, benzaldehyde, octyraldehyde, so that it is still watersoluble.

As polyvinyl esters there may be used the polymerized vinyl esters of organic acids, for instance, polyvinyl formiate, polyvinyl acetate, polyvinyl propionate, polyvinyl butyrate.

This process shows the considerable advantage that it is possible to perform the manufacture of the industrially important polyvinyl acetals in one operation from the monomeric ester by way of the polymerization product. This progress is of an industrial importance because it is possible now to avoid the previous isolation of the polyvinyl ester. Hitherto the polyvinyl ester was previously saponified so as to obtain an alcohol which was then acetalized or the polyvinyl ester was dissolved in a solvent and the saponification and the acetalization performed simultaneously. A polymerization in a solvent followed by acetalization in one operation is known; however, it has the drawback that it is difficult to make products of high molecular weight by polymerization in a solvent and that the use of a solvent adds to the cost of manufacture.

Furthermore, the acetalization of an emulsion is known, but only of emulsions of polyvinyl ester which contain real emulsifying agents, i. e., fatty substances which somehow have been rendered water-soluble. These emulsifying agents are foreign substances which during the acetalization take no part in the reaction, remain in the final product and decrease its value; therefore they must be removed by a complicated procedure. According to the present process, however, the polyvinyl alcohol applied as emulsifying agent likewise reacts with formation of acetal in such a manner that a completely uniform final product is obtained.

Instead of the aldehydes there may generally be used the compounds containing a carbonyl group. There may be used: formaldehyde, acetaldehyde, propionaldehyde, butyraldehyde, benzaldehyde, octyraldehyde, cyclohexanone, methylcyclohexanone.

The following examples serve to illustrate the invention but they are not intended to limit it thereto; the parts being by weight:

1. 260 parts of acetaldehyde, 400 parts of methyl alcohol and 25 parts of concentrated sulfuric acid are introduced, while vigorously stirring, into 2000 parts of an aqueous emulsion containing 1000 parts of polyvinyl acetate and 50 parts of polyvinyl alcohol. This mixture is then heated for 24 hours to 65° C. to 70° C., while cooling in a reflux apparatus. After the solution has been neutralized, for instance with the aid of an aqueous solution of sodium carbonate, the product is precipitated by pouring the whole into a large quantity of water, washed and then dried under reduced pressure at a temperature of 40° C. to 50° C. The yield of the solid product amounts to 650 parts.

2. 1000 parts of the aqueous emulsion of polyvinyl acetate used in Example 1 are stirred together with 210 parts of butyraldehyde, 270 parts of ethyl alcohol and 10 parts of para-toluenesulfonic acid. The solution is heated for 20 hours to 80° C. From this solution the product may be obtained in a solid form in diverse ways; for instance, after the neutralization it may be obtained in the form of finely fibrous wool or threads by spraying it through a nozzle into a current of hot air. If desired the wool or threads are washed with water until they are free from salt and then dried.

3. 150 parts of acetaldehyde, 200 parts of methyl alcohol and 25 parts of hydrochloric acid of 25 per cent. strength are introduced, while stirring, into 2000 parts of an aqueous emulsion containing 1000 parts of polyvinyl butyrate and 25 parts of polyvinyl alcohol. The mixture is heated for 10 hours to 60° C. to 65° C. After the mixture has been precipitated with water, freed from the adhering hydrochloric acid by washing and dried, there is obtained a viscous product containing acetaldehyde in an acetal-like combination besides butyric acid groups which are still present.

4. 2000 parts of an aqueous emulsion of polyvinyl acetate, obtained by emulsifying 2000 parts of a solution of 50 per cent. strength of polyvinyl acetate in benzene in 1000 parts of an aqueous solution of 5 per cent. strength of polyvinyl alcohol and subsequently distilling the benzene, while stirring, are mixed with 500 parts of ethyl alcohol, 750 parts of octyraldehyde and 40 parts of concentrated phosphoric acid and this mixture is heated, while stirring, to boiling. After about 24 hours the reaction is terminated. The product may be obtained by precipitating it with water, eliminating the acid by washing and drying in the form of a caoutchouc-like, elastic substance.

We claim:

1. The process which comprises reacting together a compound of the group consisting of aldehydes and ketones and a polyvinylester finely distributed in water in the presence of an emulsifying agent of the group consisting of polyvinyl alcohol and its watersoluble derivatives.

2. The process which comprises reacting together a compound of the group consisting of aldehydes and ketones and a polymerized vinylester of an organic carboxylic acid said polyvinylester being finely distributed in water in the presence of an emulsifying agent of the group consisting of polyvinyl alcohol and its watersoluble derivatives.

3. The process which comprises reacting together a compound of the group consisting of aldehydes and ketones and a polymerized vinylester of an organic carboxylic acid said polyvinylester being finely distributed in water in the presence of an emulsifying agent of the group consisting of polyvinyl alcohol and its watersoluble derivatives and in the presence of a strong acid as a catalyst.

4. The process which comprises causing acetaldehyde to act in the presence of sulfuric acid upon polyvinylacetate, emulsified in water in the presence of polyvinyl alcohol.

5. The process which comprises causing butyraldehyde to act in the presence of para-toluenesulfonic acid upon polyvinylacetate emulsified in water in the presence of polyvinyl alcohol.

6. The process which comprises causing acetaldehyde to act in the presence of hydrochloric acid upon polyvinylbutyrate emulsified in water in the presence of polyvinyl alcohol.

WERNER STARCK.
HEINRICH FREUDENBERGER.